United States Patent
Choi (12)

(10) Patent No.: US 10,084,497 B2
(45) Date of Patent: Sep. 25, 2018

(54) ANTENNA ASSEMBLY FOR PORTABLE DEVICE

(71) Applicant: Samsung Electronics Co., Ltd., Suwon-si, Gyeonggi-do (KR)

(72) Inventor: Chi Jeong Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/679,562

(22) Filed: Apr. 6, 2015

(65) Prior Publication Data

US 2015/0214603 A1    Jul. 30, 2015

Related U.S. Application Data

(63) Continuation of application No. 12/468,337, filed on May 19, 2009, now Pat. No. 9,002,421.

(30) Foreign Application Priority Data

Jun. 13, 2008 (KR) .................... 10-2008-0055672

(51) Int. Cl.
| | |
|---|---|
| *H04B 1/10* | (2006.01) |
| *H04B 1/3816* | (2015.01) |
| *G06K 19/077* | (2006.01) |
| *H04B 1/3883* | (2015.01) |
| *H01Q 1/24* | (2006.01) |
| *H01Q 7/00* | (2006.01) |
| *H04M 1/02* | (2006.01) |

(52) U.S. Cl.
CPC ..... *H04B 1/3816* (2013.01); *G06K 19/07773* (2013.01); *H01Q 1/242* (2013.01); *H01Q 1/243* (2013.01); *H01Q 7/00* (2013.01); *H04B 1/3883* (2013.01); *H04M 1/0262* (2013.01); *H04M 1/0214* (2013.01)

(58) Field of Classification Search
CPC .............. G06Q 20/341; G06Q 20/3415; G07F 7/1008; G07F 7/0806; G06K 19/07749; G06K 19/07; G06K 19/07703; G06K 19/07705; H02J 7/025; H01L 2924/00014; H01M 10/0525; H01M 10/425; H01M 2010/4271; H01M 2/1066; H04B 5/0062
USPC .......... 455/41.1–41.3, 19, 575.1–575.9, 558; 340/572.1, 572.7; 343/872, 873
See application file for complete search history.

(56) References Cited

U.S. PATENT DOCUMENTS

| | | | |
|---|---|---|---|
| 6,204,817 B1 * | 3/2001 | Edvardsson | H01Q 1/243 343/702 |
| 2004/0140896 A1 | 7/2004 | Ohkawa et al. | |
| 2004/0142721 A1 | 7/2004 | Kim | |
| 2005/0079820 A1 | 4/2005 | Yamashita | |
| 2006/0063557 A1 * | 3/2006 | Tanaka | H01Q 1/243 455/550.1 |

(Continued)

FOREIGN PATENT DOCUMENTS

| | | |
|---|---|---|
| JP | 2003-037861 A | 2/2003 |
| JP | 2005-333244 A | 12/2005 |
| KR | 10-2008-0049927 A | 6/2008 |

*Primary Examiner* — Allahyar Kasraian
(74) *Attorney, Agent, or Firm* — Jefferson IP Law, LLP (57) ABSTRACT

An antenna assembly for a portable device is provided. The antenna assembly includes a battery cover including a metal material, a short-range wireless communication module electrically connected to the battery cover, and a main antenna electrically connected to the short-range communication module.

19 Claims, 6 Drawing Sheets

(56) References Cited

U.S. PATENT DOCUMENTS

| | | |
|---|---|---|
| 2006/0142063 A1 | 6/2006 | Monsacre |
| 2006/0281500 A1 | 12/2006 | Huang et al. |
| 2006/0282385 A1 | 12/2006 | Cheng et al. |
| 2007/0155443 A1 | 7/2007 | Cheon et al. |
| 2007/0236404 A1* | 10/2007 | Snider ............... H01Q 1/48 343/872 |
| 2008/0019083 A1 | 1/2008 | Lim et al. |
| 2008/0055046 A1 | 3/2008 | Shimizu |
| 2008/0297350 A1 | 12/2008 | Iwasa et al. |
| 2009/0085820 A1 | 4/2009 | Akiho |
| 2009/0160713 A1* | 6/2009 | Nielsen ............... H01Q 1/243 343/702 |
| 2010/0016020 A1 | 1/2010 | Patrice |
| 2010/0026589 A1 | 2/2010 | Dou et al. |
| 2010/0272254 A1 | 10/2010 | Cheon et al. |
| 2011/0044396 A1 | 2/2011 | Fujii |
| 2011/0050164 A1 | 3/2011 | Partovi et al. |

* cited by examiner

ANTENNA ASSEMBLY FOR PORTABLE DEVICE

PRIORITY

This application is a continuation application of a prior application Ser. No. 12/468,337, filed on May 19, 2009, which claimed the benefit of a Korean patent application filed in the Korean Intellectual Property Office on Jun. 13, 2008 and assigned Serial No. 10-2008-0055672, the entire disclosure of each of which is hereby incorporated by reference.

BACKGROUND OF THE INVENTION

1. Field of the Invention

The present invention relates to portable devices. More particularly, the present invention relates to an antenna assembly for a portable device that can enhance antenna performance using a battery cover of the portable device.

2. Description of the Related Art

In recent years, portable devices have become widely used due to convenient portability. That is, mobile communication terminals have become increasingly popular since they allow users to make a voice call to called parties while users are moving.

With the increased popularity, mobile communication terminals have developed various types of appearances to appeal to the user. In particular, if the portable device case is made of a metal material, the portable device appears luxurious and elegant due to the physical characteristics of the metal. Therefore, portable devices with metal cases have increased sales growth.

On the other hand, mobile communication terminals require an antenna for communication. As a result, mobile communication terminals with metal cases have decreased antenna performance.

Therefore, a need exists for an antenna assembly for a portable device to enhance antenna performance.

SUMMARY OF THE INVENTION

An aspect of the present invention is to address at least the above-mentioned problems and/or disadvantages and to provide at least the advantages described below. Accordingly, an aspect of the present invention is to provide an antenna assembly for enhancing antenna performance of a portable device with an outer case made of metal.

In accordance with an aspect of the present invention, an antenna assembly of a portable device is provided. The antenna assembly includes a battery cover including a metal material, a short-range communication module electrically connected to the battery cover, and a main antenna electrically connected to the short-range communication module.

In accordance with another aspect of the present invention, an antenna assembly of a portable device is provided. The antenna assembly includes a battery cover comprising a metal material, a short-range communication module electrically connected to the battery cover, a main antenna electrically connected to the short-range communication module, a case coupled to the battery cover, a placement part located at one side of the case, and a SIM card interface located so that a SIM card coupled to the short-range communication module is mounted at one side of the case.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms or words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention include a portable device implemented such that a Subscriber Identity Module (SIM) card interface is electrically connected to a battery connecting interface, a first case signal line and a second case signal line are connected to antenna connecting leads formed at the battery connecting interface, and a first case pad and a second case pad are connected to the first case signal line and the second case signal line. However, the present invention is not limited thereto. That is, the first case signal line and the second case signal line may allow the first case pad and the second case pad to be directly connected to interface antenna leads formed at the SIM card interface.

Although the portable device is described based on a mobile communication terminal, the present invention is not limited thereto. That is, the portable device may be any device including an antenna. The portable device according to the present invention may be applied to all information communication devices, multimedia devices and their applications, such as, a Personal Digital Assistant (PDA), a smart phone, $3^{rd}$ Generation (3G) terminals, such as an International Mobile Telecommunication 2000 (IMT-2000) terminal, a Wideband Code Division Multiple Access (WCDMA) terminal, a Universal Mobile Telecommunication Service (UMTS) terminal and the like.

While an antenna assembly based on an antenna for performing short-range communication is described, it should be understood that the present invention is not limited thereto. For example, the antenna assembly may be applied to antennas for performing mid-range or long-range communication using a base station.

While a portable device based on a folder type-device case is described, it should be understood that the present invention is not limited by the structural type of the portable device. That is, the antenna assembly may be applied to any type of portable device that includes an antenna for communication and are manufactured in such a way that at least a portion of the portable device case is made of a metal material.

Figure 1:
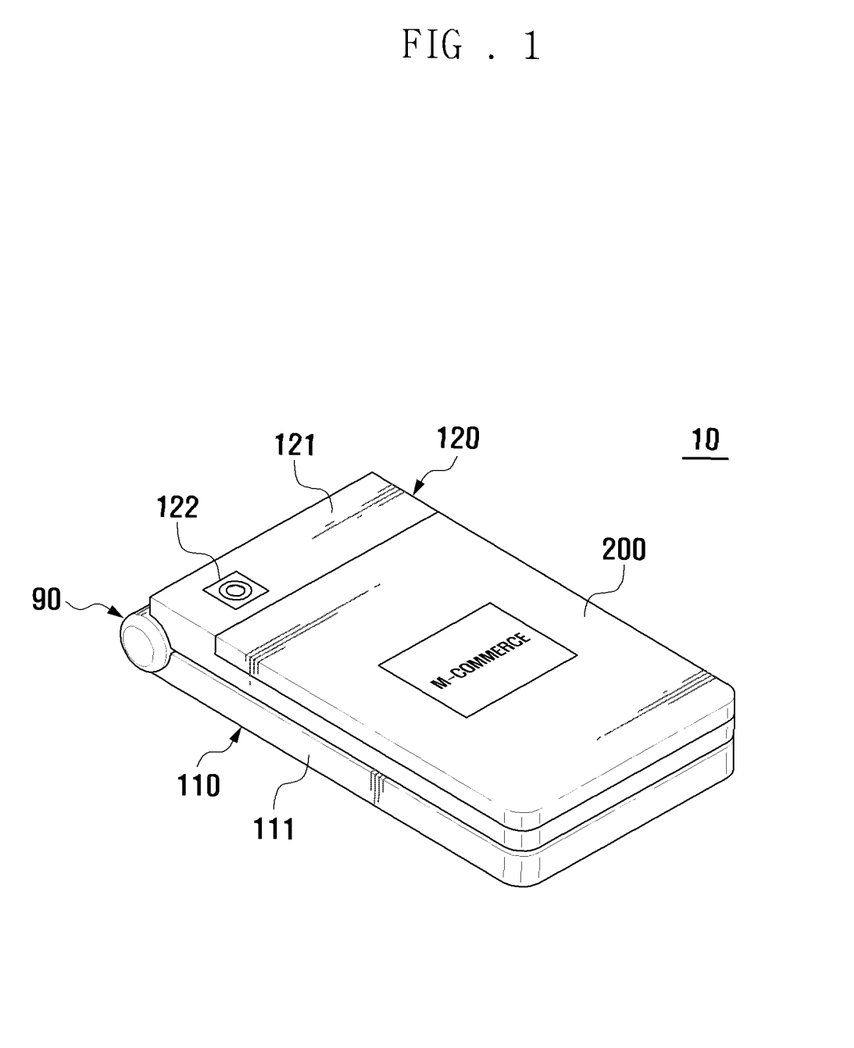
FIG. 1 is a perspective view illustrating a portable device according to an exemplary embodiment of the present invention.

FIG. 1 is a perspective view illustrating a portable device according to an exemplary embodiment of the present invention.

Referring to FIG. 1, the portable device 10 includes a first body 110, a second body 120 and a hinge 90. The second body 120 includes a case which is a battery cover 200, for example. At least a portion of the battery cover 200 is made of a metal material. The metal battery cover 200 is connected to a main antenna installed to a battery of the portable device 10 and serves as an auxiliary antenna.

Elements of the portable device 10 are explained in more detail below.

The first body 110 includes a first case 111 that covers a display unit (not illustrated), a sub-key pad (not illustrated) and a speaker (not illustrated). The first body 110 is rotated relative to the second body 120, with respect to the hinge 90, within a certain angle and folded to the front of the second body 120. The first body 110 and the second body 120 may be rotated with respect to the hinge 90, within a certain angle, and are able to close toward or open from each other.

The second body 120 includes a battery, a main key pad (not illustrated), a main Printed Circuit Board (PCB) (not illustrated), a battery cover 200 for covering an area in which the battery is placed, and a second case 121 connected to the battery cover 200. The main PCB includes Radio Frequency (RF) communication modules for RF communication of the portable device 10. More particularly, the main PCB is connected to an interface that is connected to a short-range RF communication module, for example, an RF Identification (RFID) module. The interface may be implemented with a SIM card including an RFID module. The main PCB is connected to an interface that may be connected to the battery. In an exemplary implementation, the SIM card interface and the battery connecting interface are formed in an area in which the battery of the second case 121 is placed.

The second body 120 is explained in more detail with reference to FIG. 2.

Figure 2:
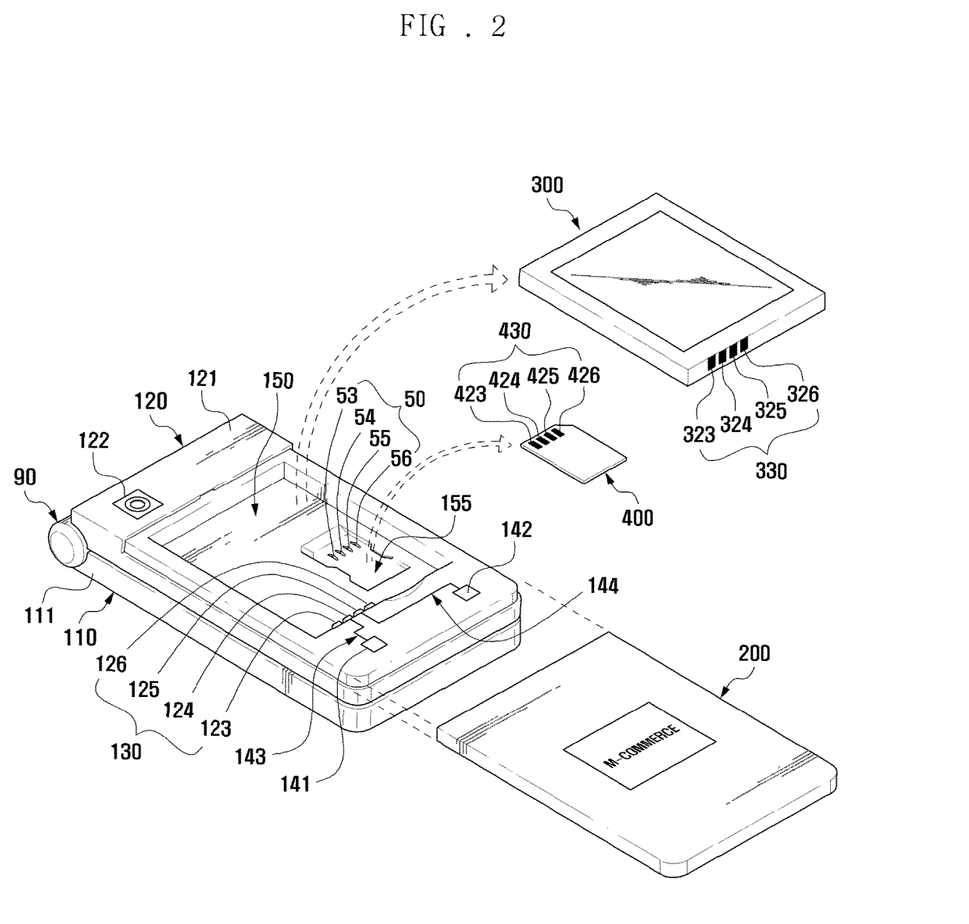
FIG. 2 is an exploded perspective view illustrating a second body of a portable device according to an exemplary embodiment of the present invention.

FIG. 2 is an exploded perspective view illustrating a second body of a portable device according to an exemplary embodiment of the present invention.

Referring to FIG. 2, the second body 210 includes the second case 121, a battery 300, a placement part 150 formed inside the second case 121 for receiving the battery 300, and a battery cover 200 for covering an opening portion of the second case 121, through which the battery 300 is placed in the placement part 150.

The second case 121 is formed such that a camera 122 is installed on one side of the second case 121, the placement part 150 receives the battery 300, a SIM card interface 155 receives a SIM card 400, a battery connecting interface 130 is connected to the battery 300, a first case pad 141 and a second case pad 142 are electrically connected to the battery cover 200, and a first case signal line 143 and a second case signal line 144 electrically connect the first case pad 141 and the second case pad 142 to the battery connecting interface 130.

The camera 122 is placed at an upper portion of the case 121. The camera 122 takes photographs or images and outputs the photographs or images to a controller. The camera 122 may be installed to the first body 110 or the hinge 90 according to the portable device's design.

The placement part 150 is formed to have a depth at the center portion of the second case 121 and receives the battery 300. The placement part 150 forms the SIM card interface 155 on its bottom surface, into which the SIM card 400 is placed. The placement part 150 forms the battery connecting interface 130 at a portion of one of its side walls, which is connected to a battery lead 330 of the battery 300. The placement part 150 is formed to correspond to the external shape of the battery 300. For example, if the battery 300 is shaped as a rectangle, the placement part 150 is also shaped as a rectangle. The placement part 150 forms a groove at one side of the upper portion of the side, through which a user's fingers may be used to place or remove the battery 300.

The SIM card interface 155 is formed to be depressed on the bottom surface of the placement part 150, considering that the battery 300 is placed on the bottom surface. The SIM card interface 155 includes a SIM card interface lead part 50 that is electrically connected to a SIM card lead part 430 of the SIM card 400. The SIM card lead part 430 is connected to the PCB through the SIM card interface lead part 50. The SIM card interface lead part 50 includes four leads, each of which is connected to leads of the SIM card lead part 430 when the SIM card 400 is placed into the SIM card interface 155. Two of the four leads of the SIM card interface lead part 50, located at both outer sides, for example, may be interface power leads 53 and 56 serving as a positive terminal and a negative terminal that supply power from the battery 300 to the SIM card 400. The remaining two leads of the SIM card interface lead part 50 located at a center portion may be interface antenna leads 54 and 55 connected to signal lines for data transmission and data reception. The two interface antenna leads 54 and 55 may be connected to the battery antenna leads 324 and 325 of the battery 300 through the battery connecting interface 130 in order to transmit data and receive data thereto and therefrom.

Although an exemplary embodiment of the present invention illustrates the SIM card interface 155 formed on a bottom surface of the placement part 150, the present invention is not limited thereto. For example, the SIM card interface 155 may be formed at one side portion of the placement part 150 or on the side of the second case.

The battery connecting interface 130 is formed at one side portion of the placement part 150 and has four battery connecting leads 123, 124, 125 and 126 that are electrically connected to the battery lead 330 of the battery 300. Two battery connecting leads 123 and 126, located at both outer sides, may be power connecting leads. The remaining battery connecting leads 124 and 125 located at the center portion may be antenna connecting leads. The battery connecting interface 130 may be resilient to firmly maintain a connection with the battery leads 330 of the battery 300. That is, the battery connecting leads 123, 124, 125 and 126 move in a direction of an area in the second case 121, in which the PCB is located, while the battery 300 is placed in the placement part 150. The battery connecting leads 123, 124, 125 and 126 then resiliently move back to the battery lead part 330 of the battery 300 placed in the placement part 150 so that resilience maintains the connection between the battery connecting leads 123, 124, 125 and 126 and the battery lead part 330. The antenna connecting leads 124 and 125 are electrically connected to the first case pad 141 and the second case pad 142 through the first case signal line 143 and the second case signal line 144, respectively. Although the battery connecting interface 130 is formed at the side of the placement part 150, the battery connecting interface 130 may also be formed at any other portion of the placement part 150, such as the bottom surface of the placement part 150.

If the battery cover 200 is coupled to the second case 121, the first case pad 141 may be located to electrically connect to the battery cover 200. Although the first case pad 141 is formed on the front of the second case 121 and at a lower portion of the placement part 150, the present invention is not limited thereto. For example, the first case pad 141 may be formed on the side of the second case 121 where the first case pad 141 contacts the battery cover 200. Therefore, the first case pad 141 may be located at any position if the first case pad 141 is formed at one side of the second case 121 and has contact with the battery cover 200. Substantially, the position of the first case pad 141 may be varied according to the frequency used by a communication module of the SIM card 400. That is, since communication modules, for example, RFID, Zigbee, and Bluetooth communication modules, in the SIM card 400 use different frequencies, the main antenna pattern may be differently formed in the battery 300 according to the frequency. Therefore, the shape of the battery cover 200, serving as an auxiliary antenna with respect to the main antenna, may be differently formed according to the main antenna pattern. Accordingly, the position of the first case pad 141, connected to the battery cover 200, may be determined by considering the shape of the battery cover 200 serving as an auxiliary antenna or signal radiation efficiency. The first case pad 141 may protrude with a certain height to electrically connect to the battery cover 200.

The second case pad 142 of the second case 121 is formed at an opposite side, being spaced apart from the first case pad 141 with a certain distance. Similar to the first case pad 141, the second case pad 142 is formed at a position such that it may be electrically connected to the battery cover 200 when the battery cover 200 is coupled to the second case 121. More particularly, the position of the second case pad 142 may be determined according to the first case pad 141 and an antenna radiation pattern formed when the second case pad 142 is connected to the battery cover 200. That is, after the first case pad 141 and the second case pad 142 have contact with the battery cover 200, the electrical signal flow, generated when the battery cover 200 is operated as a loop antenna, may be varied according to the distance between the first case pad 141 and the second case pad 142 and according to the positions of respective case pads from the battery cover 200. Therefore, the position of the second case pad 142 may be determined considering the electrical signal flow. When the first case pad 141 and the second case pad 142 substantially have contact with the battery cover 200 and then a signal flows thereto from the SIM card 400 or the outside, an electrical signal circulates on the battery cover 200. The amount of electrical signals that circulate around the entire battery cover 200 and then travel to the first case pad 141 or the second case pad 142 is larger than the amount of electrical signals traveling along the shortest electrical path between the first case pad 141 and the second case pad 142. Therefore, if the first case pad 141 and the second case pad 142 are not mechanically close to each other, the antenna radiation efficiency of the electrical signal traveling along the battery cover 200 may be properly achieved. Similar to the first case pad 141, the second case pad 142 may protrude with a certain height to electrically connect to the battery cover 200.

The first case signal line 143 and the second case signal line 144 electrically connect the antenna connecting leads 124 and 125 to the first case pad 141 and the second case pad 142, respectively and correspondingly. The first case signal line 143 and the second case signal line 144 lengths and shapes are variously formed according to the arrangement of the first case pad 141 and the second case pad 142. Although the appearance of the second case 121 is made of a metal material, if an area wrapping the PCB, placed at the bottom surface of the placement part 150, is made of a plastic material, the plastic area may allow a certain pattern to be formed. The first case signal line 143 and the second case signal line 144 are formed in the inner side of the lower area of the placement part 150 to prevent contact with the battery cover 200 when the battery cover 200 covers the portable device and is connected to the first case pad 141 and the second case pad 142.

The battery 300 is placed in the placement part 150 of the second case 121 and is connected to the battery connecting interface 130. The battery lead 330 of the battery is electrically connected to the battery connecting interface 130. The battery lead 330 includes two battery power leads 323 and 326 electrically connected to the power connecting leads 123 and 126 of the battery connecting interface 130. The battery lead 330 also includes two battery antenna leads 324 and 325 electrically connected to the antenna connecting leads 124 and 125 of the battery connecting interface 130. The battery 300 will be explained in more detail with reference to FIG. 3.

The battery cover 200 is coupled to the second case 121 to cover the placement part 150 of the second case 121. At least a portion of the battery cover 200 is made of a metal material. The battery cover 200 is pushed up from the lower portion to the upper portion of the second case 121, along mechanical paths formed at outer portions of the placement part 150 of the second case 121, and then coupled to the second case 121. In an exemplary implementation, a coupling method may be modified according to the portable device type and features or a portable device's design purpose. The metal material of the battery cover 200 may include copper alloy, aluminum alloy, stainless steel and the like based on the portable device's design purpose. However, the antenna radiation efficiency may differ according to the characteristics of the metal used. The battery cover 200 will be explained in more detail with reference to FIG. 4.

The interface power leads 53 and 56 of the SIM card interface 155 may include signals electrically connected to power connecting leads of the battery connecting interface 130. The interface antenna leads 54 and 55 may include signal lines electrically connected to the antenna connecting leads 124 and 125. When the SIM card 400 is placed into the SIM card interface 155, the SIM card lead part 430 is connected to the battery connecting interface 130 through the SIM card interface 155. When the battery 300 is placed in the placement part 150, the battery lead 330 is placed into the battery interface 130 and has contact with the battery interface 130 to electrically connect to the SIM card lead part 430. When the SIM card antenna leads 424 and 425 of the SIM card lead part 430 are electrically connected to the first case pad 141 and the second case pad 142, respectively, through the SIM card interface 155, the battery connecting interface 130, and the first case signal line and the second case signal line 144, the battery cover 200 is then coupled to the second case 121. The SIM card interface 155, the battery connecting interface 130, and the first case signal line and the second case signal line 144 are electrically connected to the battery cover 200 through the first cover pad and the second cover pad that are electrically connected to the first case pad 141 and the second case pad 142.

The portable device may support signal radiation of a communication module included in the SIM card 400 using the main antenna formed at one side of the battery 300 and allow the battery cover 200 made of a metal material to serve as an auxiliary antenna, thereby reducing an interference effect caused by the battery cover 200 when signals are radiated and enhancing the antenna radiation efficiency.

Figure 3:
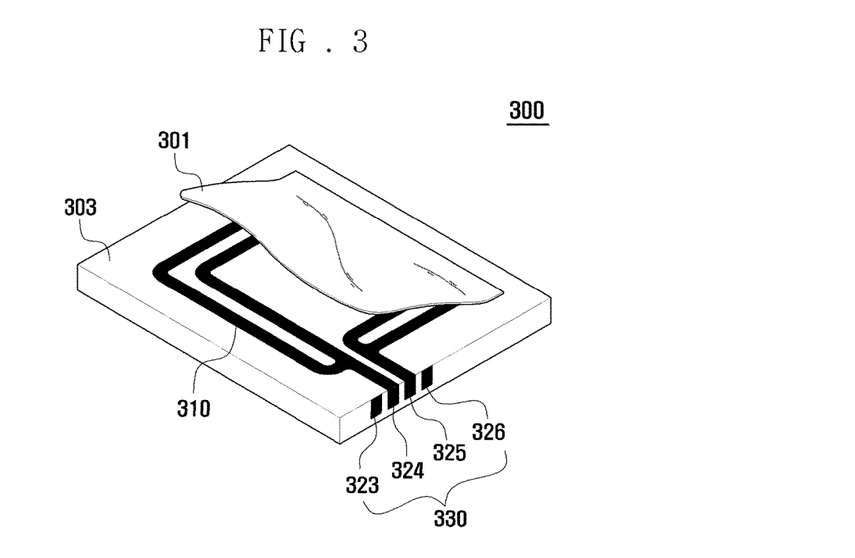
FIG. 3 is a view illustrating a battery structure according to an exemplary embodiment of the present invention.

FIG. 3 is a view illustrating a structure of a battery according to an exemplary embodiment of the present invention.

Referring to FIG. 3, the battery 300 is configured such that a battery case 303 wraps a battery internal structure, a main antenna 310 is formed in front of the battery case 303, a sticker 301 covers the main antenna 310, and a battery lead 330 is connected to the battery internal structure and the main antenna 310.

The battery case 303 is made of a non-metal material, for example, plastic, and wraps the battery internal structure. If the battery internal structure is a secondary cell containing liquid, the battery internal structure may be completely sealed by the battery case 303. The battery case 303 may be variously shaped according to the battery internal structure and the shape of the placement part 150 of the second case. The battery lead 330 is formed on one side of the battery case 303 and includes two battery power leads 323 and 326 and two battery antenna leads 324 and 325. The two battery power leads 323 and 326 are connected to the battery's internal structure and supply power to the portable device. The two battery antenna leads 324 and 325 are connected to the main antennas 310 and contact particular leads of the battery connecting interface 130.

The main antenna 310 may be formed as a pattern, for example, a loop, on one side of the battery case 303. The main antenna 310 may be installed on an outer surface of the battery case 303 that is made of plastic. The main antenna 310 serves as an antenna of a short-range wireless communication module included in the SIM card 400. If the SIM card 400 includes a short-range wireless communication module, such as an RFID, the main antenna 310 receives a signal from an RFID reader and transmits the signal to the wireless communication module of the SIM card 400. The main antenna 310 also transmits information stored in the SIM card 400 to the external RFID reader. The main antenna 310 is connected to the battery antenna leads 324 and 325 formed at one side of the battery case 303, which have contact with the antenna connecting leads 124 and 125 of the battery connecting interface 130. Thus, the main antenna 310 is connected to the SIM card 400.

The sticker 301 is placed on the main antenna 310 that is formed on the battery case 303 to prevent the main antenna 310 from having contact with an external structure, for example, a battery cover or other structures formed on the second case. The sticker 301 may be placed on the main antenna 310 and adhered to the battery case 303 to prevent the main antenna 310 from scratching or damaging by the covering or removing operation of the battery cover 200. The sticker 301 is placed in and adhered to an area that is depressed from the front surface of the battery case 303 so that the sticker 301 cannot be removed from the surface of the battery case 303 by placing or removing the battery 300. Therefore, the main antenna 310 may be installed, as a pattern, in the depressed area of the front surface of the battery case 303.

The battery lead 330 includes battery power leads 323 and 326, which serves as a power terminal that supplies power from the battery internal structure, and battery antenna leads 324 and 325 connected to the main antenna 310. The battery power leads 323 and 326 and the battery antenna leads 324 and 325 are connected to the battery connecting interface 130 of the placement part 150 as the battery 300 is placed in the placement part 150. Since the battery connecting interface 130 is connected to the SIM card interface 155, the battery lead 330 may be electrically connected to the SIM card interface 155 through the battery connecting interface 130.

Figure 4:
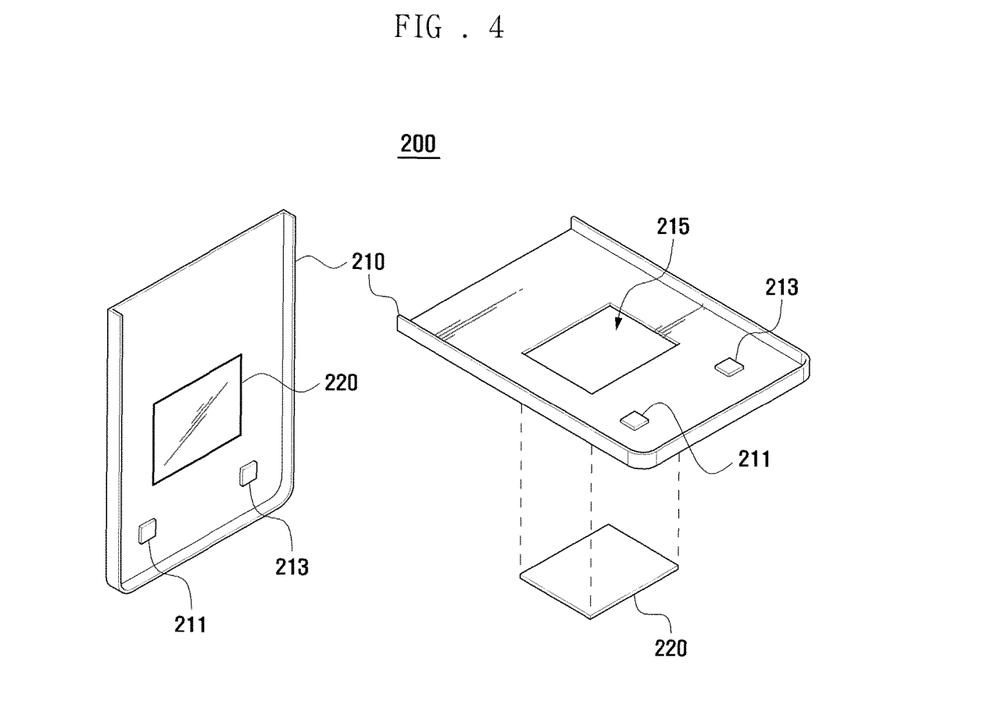
FIG. 4 is an exploded perspective view illustrating a battery cover according to an exemplary embodiment of the present invention.

FIG. 4 is an exploded perspective view illustrating a battery cover according to an exemplary embodiment of the present invention.

Referring to FIG. 4, the battery cover 200 includes a cover body 210, an auxiliary structure 220, a first cover pad 211 and a second cover pad 213.

The cover body 210 includes a cover part, three side walls perpendicularly extended at three edges of the cover part, with a certain height, and a hole 215 formed at a certain area in the cover part. The cover body 210 has an opened side wall at one edge. The cover body 210 is coupled with the second case through its opened side wall. Accordingly, the three side walls of the cover body 210 meet the outer sides of the placement part of the second case. The hole 215 is formed at a certain area of the cover part, for example, the center area, and allows the auxiliary structure 220 to be mounted thereto. The cover part is shaped as a ring structure with respect to the hole 215.

The auxiliary structure 220 is placed in the hole 215 of the cover part and may have a design or a logo. The auxiliary structure 220 is made of a non-metal material, for example, plastic. An adhesive may be further applied to the gap between the edge of the auxiliary structure 220 placed in the hole 215 and the cover part. If the auxiliary structure 220 is manufactured slightly larger than the hole 215, the auxiliary structure 220 may be fitted into the hole 215.

The first cover pad 211 is formed in a certain area of the inside wall of the cover part, which corresponds to the position of the first case pad 141 of the placement part 150. Therefore, when the battery cover 200 is coupled to the second case, the first cover pad 211 is electrically connected to the first case pad 141.

The second cover pad 213 is also formed in a certain area of the inside wall of the cover part, which is spaced apart from the first cover pad 211 with a certain distance. Similar to the relationship between the first cover pad 211 and the first case pad 141, the position of the second cover pad 213 corresponds to the position of the second case pad 142 of the placement part 150. Therefore, when the battery cover 200 is coupled to the second case, the second cover pad 213 is electrically connected to the second case pad 142.

In order to have firm contact between the first cover pad 211 and the second cover pad 213 and the first case pad 141 and the second case pad 142, the first cover pad 211 and the second cover pad 213 may be shaped as a clip structure so that the first cover pad 211 and the second cover pad 213 may be coupled to each other. More specifically, the first case pad 141 is extended at a certain height from the surface of the second case and shaped as '┐' in the cross-sectional view, which is opened in the rear side of the second case. The first cover pad 211 is shaped as '⊏,' in the cross-sectional view, which is opened in the upper side of the cover body 210. Therefore, when the battery cover 200 is coupled to the second case, the first case pad 141 is placed into the first cover pad 211 so that they may have firm contact with each other.

In an exemplary implementation, the first case pad 141 may be formed to be unevenly protrudent on the surface of the second case or the first cover pad 211 may also be unevenly protruded on the bottom surface of the cover part. Therefore, when the battery cover 200 is coupled to the second case, the first case pad 141 and the first cover pad 211 may have firm contact with each other. Furthermore, if the first case pad 141 or the first cover pad 211 is formed as an uneven shape under which a spring is installed, the first case pad 141 and the first cover pad 211 may have firm contact with each other by elasticity of the spring while the battery cover 200 is coupled to the second case. Similarly, the second case pad 142 and the second cover pad 213 may be implemented to have the same structure as the first case pad 141 and the first cover pad 211, as described above.

Figure 5:
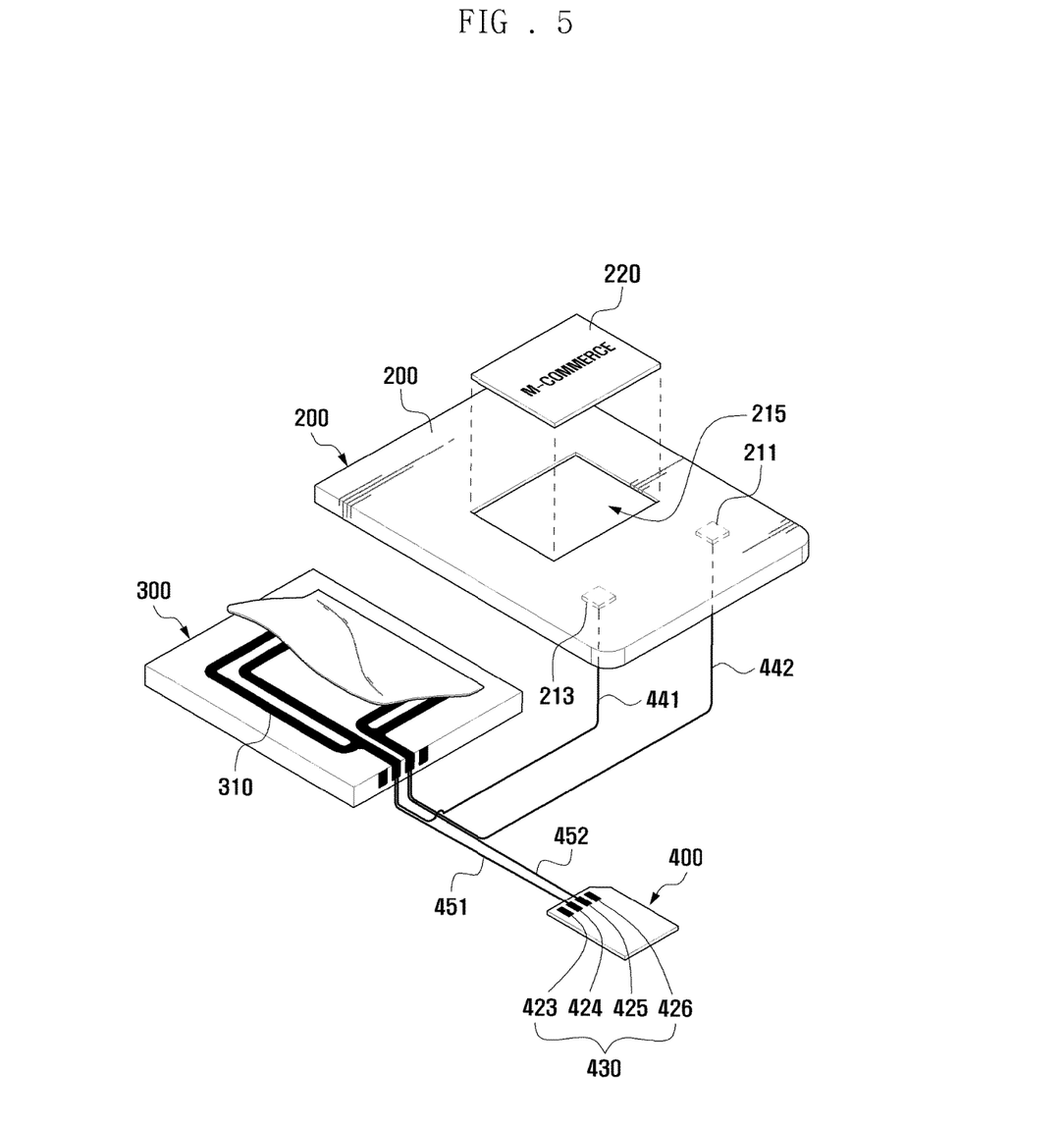
FIG. 5 is an exploded perspective view illustrating an antenna assembly according to an exemplary embodiment of the present invention.

FIG. 5 is an exploded perspective view illustrating an antenna assembly according to an exemplary embodiment of the present invention.

Referring to FIG. 5, the antenna assembly of a portable device includes a main antenna 310 formed at one side of a battery 300, a battery cover 200, and a SIM card 400. When the SIM card 400 is connected to a SIM card interface 155 and the battery 300 is connected to a battery connecting interface 130, the SIM card 400 is connected to respective leads of the battery 300 and also connected to the battery cover 200 through the battery connecting interface 130. Respective elements are electrically connected to each other by signal lines, such as a signal line between the SIM card interface 155 and the battery connecting interface 130, and the first case signal line 143 and the second case signal line 144 formed at one side of the second case 121.

The SIM card 400 includes battery power leads 423 and 426, and antenna leads 424 and 425. The antenna leads 424 and 425 of the SIM card 400 are connected to a first path 451 and a second path 452 that include the battery antenna leads 324 and 325, the interface antenna leads and the antenna connecting leads that are formed in the SIM card interface 155 and the battery connecting interface 130, and signal lines connecting the interface antenna leads and the antenna connecting leads. The signal line connecting the interface antenna leads and the antenna connecting leads may be formed in the inner side of the second case.

The SIM card antenna leads 424 and 425 are electrically connected to the battery cover 200 through a third path 441 and a fourth path 442 that includes parts of the first path 451 and the second path 452. The first path 451 and the second path 452 do not include the signal lines connecting the interface antenna leads and the antenna connecting leads, the first signal line 143 and the second signal line 144 connected to the antenna connecting leads 124 and 135, the first case pad 141 and the second case pad 142, and the first cover pad 211 and the second cover pad 213 connected to the first case pad 141 and the second case pad 142. The battery cover 200 may be formed as a ring shape with respect to the auxiliary structure 220 inserted into the hole 215. Therefore, the battery cover 200 serves as an auxiliary antenna in a ring shape, compared with the main antenna 310 shaped as a loop.

The SIM card antenna leads 424 and 425 are connected to the battery antenna leads 324 and 325 so that the main antenna 310 may be used together with the battery cover as an auxiliary antenna, which is electrically connected to the battery antenna leads 324 and 325.

As described above, the antenna assembly of the portable device, according to an exemplary embodiment of the present invention, may use the main antenna 310 connected to the SIM card 400 and the battery cover 200 serving as an auxiliary antenna, thereby improving its antenna function. The antenna assembly does not cause interference due to the battery cover 200 being made of a metal material and increases antenna radiation efficiency through the battery cover 200.

Figure 6A:
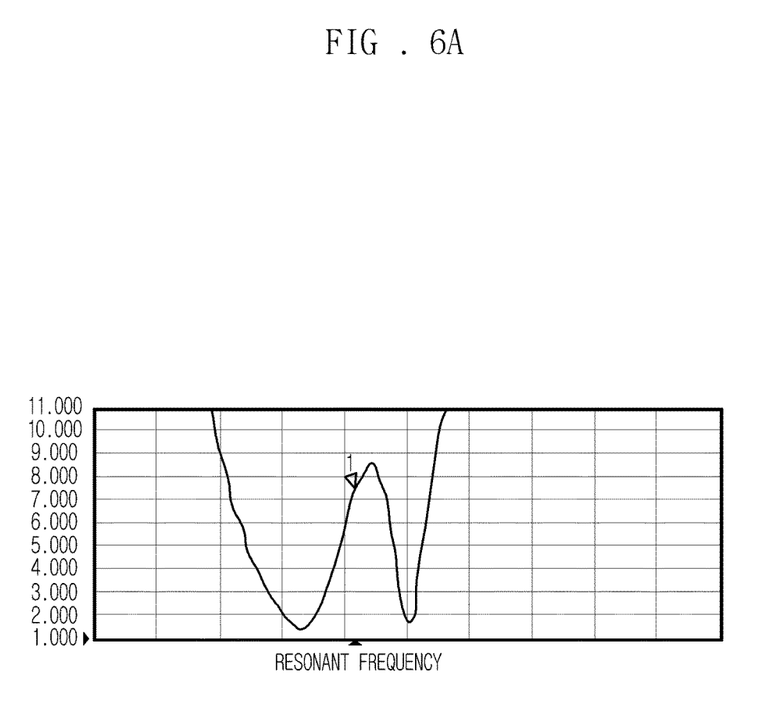
FIG. 6A is a graph of an antenna radiation pattern using a conventional battery cover made of a metal.
Figure 6B:
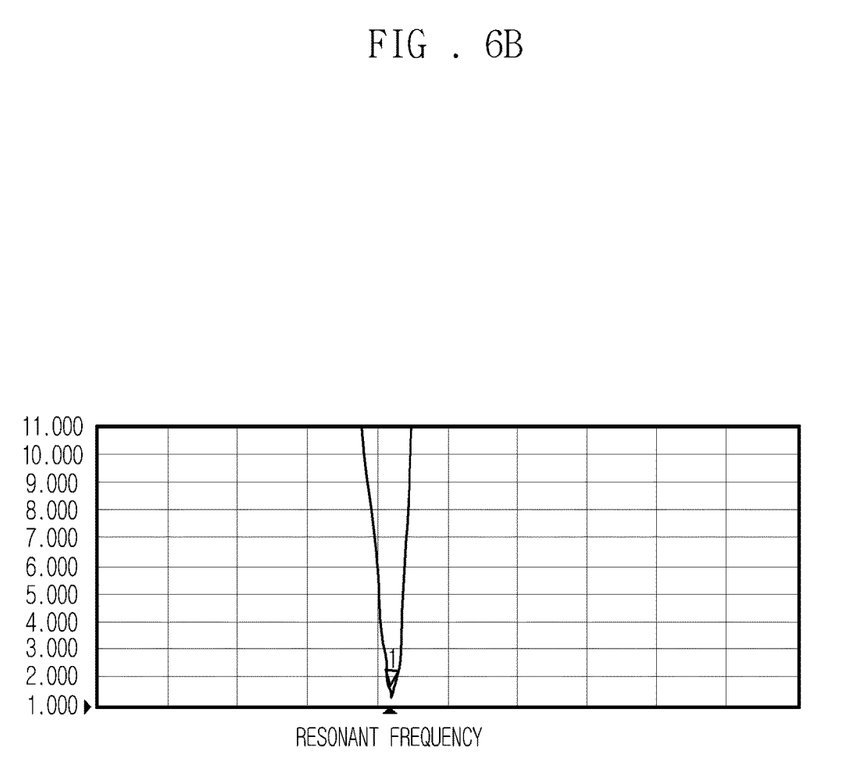
FIG. 6B is a graph of a radiation pattern of an antenna assembly of a portable device according to an exemplary embodiment of the present invention.

FIG. 6A is a graph of an antenna radiation pattern using a conventional battery cover made of a metal material. FIG. 6B is a graph of a radiation pattern of an antenna assembly of a portable device according to an exemplary embodiment of the present invention.

Referring to FIG. 6A, an antenna radiation pattern of a short-range communication module included in a SIM card module using a conventional battery cover made of a metal material is illustrated. A resonant frequency is not properly generated in the main antenna due to interference from the battery cover. That is, when the metal battery cover performs antenna radiation, parasite resonance is generated. Thus, the resonant frequency is shifted by a certain amount. Therefore, the conventional antenna assembly has difficulty setting or acquiring a proper resonant frequency due to interference from the battery cover.

On the contrary, as illustrated in FIG. 6B, the antenna assembly uses the main antenna and the battery cover 200 as an antenna to acquire a proper resonant frequency and secure a resonant frequency range with a sharp resonant frequency peak. Since the antenna assembly allows the battery cover to serve as an auxiliary antenna, the antenna assembly may reduce the size of the main antenna and also adjust the size of the auxiliary structure used for the battery cover. The antenna assembly uses the battery cover as an auxiliary antenna with respect to the main antenna, where the battery cover does not cause interference. Since the auxiliary structure formed in the battery cover may be implemented variously in size, the size of the main antenna may be reduced.

Although an exemplary embodiment of the present invention is described based on a portable device having a SIM card connected to a battery cover and a main antenna, where the SIM card provides particular services, the present invention is related to an arrangement of an antenna of a short-range communication module included in the portable device and may be applied where the short-range communication module is included in the SIM card or placed in any other space.

Although an exemplary embodiment of the present invention is implemented such that a battery connecting interface is connected to a first case pad and a second case pad through a first case line and a second case line and then connected to a battery cover, the present invention is not limited thereto. For example, the battery cover may contact pads contacting signal lines that are directly connected to an interface antenna lead formed in a SIM card interface or a SIM card antenna lead formed in a SIM card. Accordingly, a second case includes signals lines, connected to an interface antenna lead part of the SIM card interface, and case pads contacting the signal lines so that the case pads may electrically contact the cover pads formed in the battery cover.

As described above, the antenna assembly according to an exemplary embodiment of the present invention may enhance antenna performance of a portable device and remove limitations of portable device cases so that the portable device may have characteristic and useful appearance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile communication device comprising:
   a battery;
   communication circuitry to establish a wireless communication;
   an antenna including a first radiating element and a second radiating element;
   a conductive member coupled with the communication circuitry, at least part of the conductive member being operable as the first radiating element;
   a metal housing covering at least part of the battery and forming at least one portion of an outer surface of the mobile communication device, the metal housing being physically coupled with the conductive member, and at least part of the metal housing being operable as the second radiating element; and
   a non-metal element mounted on an opening of the metal housing,
   wherein the first radiating element and the second radiating element resonate in a frequency with respect to the wireless communication, and
   wherein the opening is configured to reduce a parasitic resonance formed between the first radiating element and the second radiating element.

2. The mobile communication device of claim 1, wherein the conductive member is disposed between the battery and the metal housing such that the conductive member at least partially overlaps with the battery and the metal housing.

3. The mobile communication device of claim 1,
   wherein the conductive member comprises a plurality of terminals including a first terminal and a second terminal, and
   wherein at least one of the first terminal or the second terminal is coupled with the metal housing.

4. The mobile communication device of claim 1, wherein the metal housing radiates a signal received from the conductive member.

5. The mobile communication device of claim 1,
   wherein the conductive pattern comprises a loop antenna, and
   wherein the loop antenna is disposed such that the loop antenna surrounds at least some of a periphery of the opening.

6. A mobile communication device comprising:
   a front outer side including a display;
   an antenna including a first radiating element and a second radiating element;
   a rear outer side including a first portion composed of a conductive material and a second portion composed of a non-conductive material, the rear outer side covering at least part of a battery of the mobile communication device, and at least part of the rear outer side being operable as the first radiating element; and
   a conductive member at least partially enclosed within the rear outer side and physically coupled with the first portion composed of the conductive material, the conductive member being operable as the second radiating element,
   wherein the first radiating element and the second radiating element resonate in a frequency with respect to a specified wireless communication, and
   wherein an opening of the rear outer side is configured to reduce a parasitic resonance formed between the first radiating element and the second radiating element.

7. The mobile communication device of claim 6, wherein the conductive member and the first portion are coupled via an elastic conductive structure.

8. The mobile communication device of claim 6,
   wherein the conductive member comprises a plurality of terminals including a first terminal and a second terminal, and
   wherein the first terminal and the second terminal are coupled with the first portion.

9. The mobile communication device of claim 8, further comprising:
   communication circuitry coupled with the first terminal and the second terminal.

10. The mobile communication device of claim 8,
    wherein the first portion comprises a plurality of connecting points including a first connecting point and a second connecting point, and
    wherein the first terminal is coupled with the first connecting point, and the second terminal is coupled with the second connecting point.

11. The mobile communication device of claim 6, wherein the conductive member is disposed between the battery and the rear outer side such that the conductive member at least partially overlaps with the battery and the rear outer side.

12. The mobile communication device of claim 6, wherein the conductive member comprises a loop antenna.

13. The mobile communication device of claim 6, wherein the first portion of the rear outer side is configured to receive an electrical signal from the conductive member, the electrical signal to be circulated on or in the rear outer side.

14. The mobile communication device of claim 6, wherein the conductive member is disposed such that the conductive member surrounds at least some of a periphery of the opening.

15. The mobile communication device of claim 6, wherein the opening comprises the non-conductive material formed therein.

16. A mobile communication device comprising:
- a display;
- communication circuitry to establish a wireless communication;
- an antenna coupled with the communication circuitry; and
- a conductive housing enclosing the antenna and forming at least one portion of an outer surface of the mobile communication device, the conductive housing physically coupled with the antenna such that at least one portion of the conductive housing can radiate a signal received from the antenna,
- wherein the conductive housing includes an opening,
- wherein the antenna and the conductive housing resonate in a frequency with respect to the wireless communication, and
- wherein the opening is configured to reduce a parasitic resonance formed between portions of the conductive housing and the antenna.

17. The mobile communication device of claim 16, wherein the wireless communication comprises a short range wireless communication.

18. The mobile communication device of claim 16, wherein the opening comprises a non-conductive portion formed therein.

19. The mobile communication device of claim 16, wherein a commercial marking is disposed within the opening.

\* \* \* \* \*